J. B. WIARD.
DYNAMO ELECTRIC MACHINE.
APPLICATION FILED SEPT. 28, 1917.
1,267,828.
Patented May 28, 1918.
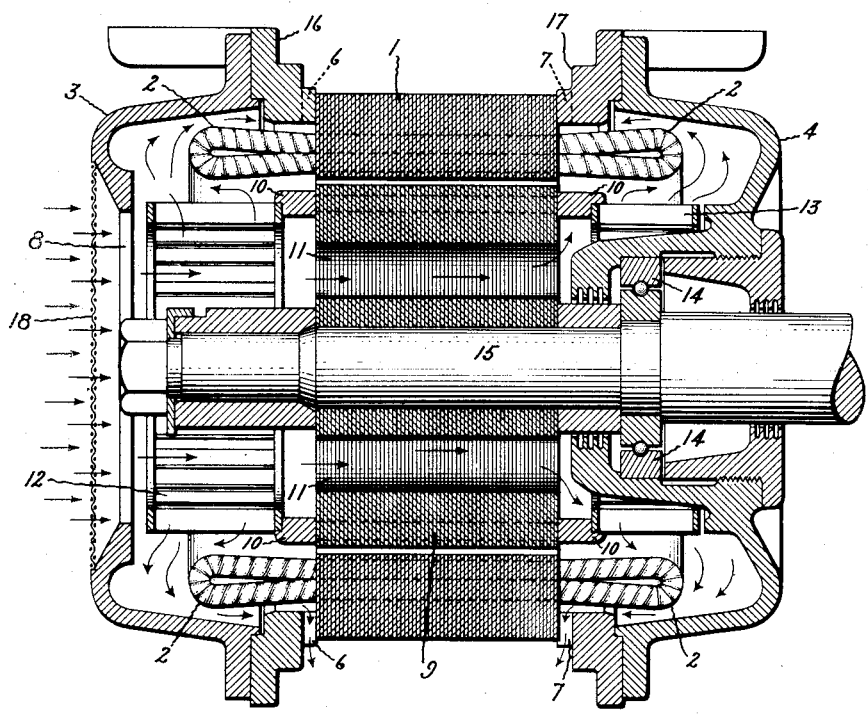
Inventor:
John B. Wiard,
by Albert G. Davis
His Attorney.

UNITED STATES PATENT OFFICE.

JOHN B. WIARD, OF LYNN, MASSACHUSETTS, ASSIGNOR TO GENERAL ELECTRIC COMPANY, A CORPORATION OF NEW YORK.

DYNAMO-ELECTRIC MACHINE.

1,267,828.   Specification of Letters Patent.   Patented May 28, 1918.

Application filed September 28, 1917. Serial No. 193,815.

*To all whom it may concern:*

Be it known that I, JOHN B. WIARD, a citizen of the United States, residing at Lynn, county of Essex, State of Massachusetts, have invented certain new and useful Improvements in Dynamo-Electric Machines, of which the following is a specification.

My invention relates to dynamo electric machines and particularly to the ventilation of such machines, and has for its object an arrangement of parts whereby the velocity of the air, particularly as it enters the machine, is materially lower than in machines as heretofore constructed. With a machine constructed in accordance with my invention, it is possible to effectively ventilate the same and to operate it in an atmosphere containing fine particles, such as lint and dust, without clogging up the intake opening of the motor, or the screen protecting the intake. To this end, my invention comprises a novel arrangement and construction of the parts of a dynamo electric machine, hereinafter described and particularly pointed out in the claims.

For a better understanding of my invention, reference may be had to the following description taken in connection with the accompanying drawing, in which the single figure is a cross-sectional view of a dynamo electric machine embodying my invention.

In the drawing, 1 is a field member of a dynamo electric machine provided with windings 2; 3 and 4 are end frame members forming with the field member 1 an inclosing casing provided with air outlet openings 6 and 7 adjacent each end of the field member. The end frame member 3 has a large air inlet opening 8. The machine has a rotor 9 provided with windings 10, longitudinal air passages 11 therethrough and fan members 12 and 13, one mounted on each end of the rotor. These fan members draw air into the machine through the inlet opening 8 and pass it through the machine in the two paths, one of the paths being through the fan member 12 adjacent the inlet opening, and the field windings 2, and out through the outlet openings 6 at that end of the machine, and the other of the paths being through the longitudinal air passage 11 in the rotor, through the fan 13 at the opposite end of the machine, around the field windings 2 and out through the outlet openings 7 at that end of the machine.

The end frame member 4 is shown as completely inclosing that end of the motor and has a bearing 14, in which is journaled the shaft 15 on which the rotor 9 is mounted. I preferably have no bearing for the shaft 15 in the end frame member 3, the rotor 9 overhanging the bearing 14. In this way, the inlet opening 8 may be made relatively large and unobstructed.

In the particular dynamo electric machine shown, the field member 1 comprises a field core held between two core flanges 16 and 17, the core flange 16 being provided with a plurality of radially distributed air outlet openings 6, and the core flange 17 being provided with similar air outlet openings 7.

The inlet opening 8 is provided with a screen 18 which may be made of sufficiently small mesh to catch substantially all lint and dust and at the same time permit the entrance of a sufficient volume of air for ventilation. By not providing any bearing in the end member 3, the inlet opening 8 may be unobstructed, large and of a diameter substantially equal to that of the fan 12, so that the velocity of the air flowing into the motor through the inlet opening will be low. With such arrangement, the air outside the motor and adjacent the inlet opening will not be agitated and consequently particles of dirt will not be drawn into the meshes of the screen and clog the same or the intake of the motor.

I have illustrated my invention in an induction motor, but it is evident that it is applicable to any form of dynamo electric machine. I aim in the appended claims to cover any modification which does not depart from the spirit and the scope of my invention.

What I claim as new, and desire to secure by Letters Patent of the United States is:

1. A dynamo electric machine comprising a field member and end frame members forming with the field member an inclosing casing provided with an air outlet opening adjacent each end of the field member, one of said end frame members having a relatively large air inlet opening, windings on said field member, a rotor provided with longitudinal air passages, windings on said rotor, and a fan member at each end of said rotor for drawing cooling air into the machine through said air inlet opening and passing it through said machine in two paths, one of said paths being through the fan member adjacent said inlet opening, around the field windings and out through the outlet opening at that end of the machine, the other of said paths being through the longitudinal air passages in the rotor through the fan at the opposite end around the field windings and out through the outlet opening at that end of the machine.

2. A dynamo electric machine comprising a field member and two end frame members forming with the field member an inclosing casing and provided with an air outlet opening adjacent each end of the field member, windings on said field member, a shaft bearing in only one of said end frame members, the other of said end frame members being provided with a relatively large unobstructed air inlet opening, a shaft carried in said shaft bearing, a rotor member mounted on said shaft and provided with longitudinal air passages therethrough, windings on said rotor, fan members at each end of said rotor for drawing cooling air into the machine through said air inlet opening and passing it through said machine in two paths, one of said paths being through the fan member adjacent said inlet opening, around the field windings and out through the outlet opening at that end of the machine, the other of said paths being through the longitudinal air passages in the rotor, through the fan member at the bearing end, around the field windings and out through the outlet opening at that end of the machine.

3. A dynamo electric machine comprising a field member and two end frame members forming with the field member an inclosing casing and provided with a plurality of radially distributed air outlet openings adjacent each end of the field member, windings on said field member, a shaft bearing in only one of said end frame members, the other of said end frame members being provided with a relatively large, unobstructed air inlet opening, a shaft carried in said shaft bearing, a rotor member mounted on said shaft and provided with longitudinal air passages therethrough, windings on said rotor, fan members at each end of said rotor for drawing cooling air into the machine through said air inlet opening and passing it through said machine in two paths, one of said paths being through the fan member adjacent said inlet opening, around the field windings and out through said outlet openings at that end of the machine, the other of said paths being through the longitudinal air passages in the rotor, through the fan at the bearing end, around the field windings and out through said outlet openings at that end of the machine.

4. A dynamo electric machine comprising a field core, a core flange at each end of said core, each of said flanges being provided with a plurality of radially distributed air outlet openings, and two end frame members forming with the aforementioned parts an inclosing casing, windings on said field member, a shaft bearing in only one of said end frame members, the other of said end frame members being provided with a relatively large, unobstructed and screened air inlet opening, a shaft carried in said shaft bearing, a rotor member mounted on said shaft and provided with longitudinal air passages therethrough, windings on said rotor, fan members at each end of said rotor for drawing cooling air into the machine through said air inlet opening and passing it through said machine in two paths, one of said paths being through the fan member adjacent said inlet opening, around the field windings and out through said outlet openings at that end of the machine, the other of said paths being through the longitudinal air passages in the rotor, through the fan at the bearing end, around the field windings and out through said outlet openings at that end of the machine.

In witness whereof, I have hereunto set my hand this 24th day of September, 1917.

JOHN B. WIARD.